(12) United States Patent
Chatterjee et al.

(10) Patent No.: US 7,802,063 B1
(45) Date of Patent: Sep. 21, 2010

(54) METHOD, SYSTEM, APPARATUS, AND COMPUTER-READABLE MEDIUM FOR IMPROVING DISK ARRAY PERFORMANCE

(75) Inventors: Paresh Chatterjee, Fremont, CA (US); Vijayarankan Muthirisavenugopal, Chennai (IN); Ajit Narayanan, Fremont, CA (US)

(73) Assignee: American Megatrends, Inc., Norcross, GA (US)

( * ) Notice: Subject to any disclaimer, the term of this patent is extended or adjusted under 35 U.S.C. 154(b) by 0 days.

(21) Appl. No.: 12/723,861

(22) Filed: Mar. 15, 2010

Related U.S. Application Data

(62) Division of application No. 11/450,652, filed on Jun. 9, 2006, now Pat. No. 7,711,897.

(60) Provisional application No. 60/689,481, filed on Jun. 10, 2005.

(51) Int. Cl.
*G06F 12/00* (2006.01)

(52) U.S. Cl. .................. 711/156; 711/112; 711/114; 711/170; 711/221; 707/781; 707/802; 707/812; 714/5; 714/6; 714/7

(58) Field of Classification Search .............. 711/156, 711/112, 114, 170, 221; 707/781, 802, 812; 714/5, 6, 7
See application file for complete search history.

(56) References Cited

U.S. PATENT DOCUMENTS 4,942,579 A    7/1990   Goodlander et al.

(Continued)

OTHER PUBLICATIONS

U.S. Official Action dated Aug. 3, 2009 in U.S. Appl. No. 11/450,652.

(Continued)

*Primary Examiner*—Stephen C Elmore
(74) *Attorney, Agent, or Firm*—Aaronson & Waldman, LLC

(57) ABSTRACT

A method, system, apparatus, and computer-readable medium are provided for improving storage in a disk array are provided. According to aspects of the invention, a redundant disk array is combined with a mechanism for thin provisioning of the array. Thin provisioning refers to a process of allocating physical capacity to logical volumes on an as-needed basis. Data structures containing a mapping between the logical location of stored data and its actual location on a physical device are maintained. Through the use of the thin provisioning mechanism, physical storage space can be allocated sequentially, regardless of the order of logical writes. In this manner, the data stored on the array grows in a linear manner. The data structures maintained by the thin provisioning mechanism can be used to identify the portions of a device or an array that have been previously written. This information allows redundant arrays, such as RAID arrays, to perform initialization, rebuild, and data migration operations only on portions that been written, and not on areas that have not been utilized by a higher layer.

3 Claims, 15 Drawing Sheets

U.S. PATENT DOCUMENTS

| | | | |
|---|---|---|---|
| 5,257,367 A | 10/1993 | Goodlander et al. | |
| 5,720,027 A | 2/1998 | Sarkozy et al. | |
| 5,732,238 A | 3/1998 | Sarkozy | |
| 5,790,774 A | 8/1998 | Sarkozy | |
| 5,893,919 A | 4/1999 | Sarkozy et al. | |
| 6,098,128 A | 8/2000 | Velez-McCaskey et al. | |
| 6,185,663 B1 * | 2/2001 | Burke | 711/156 |
| 6,546,458 B2 * | 4/2003 | Milligan et al. | 711/114 |
| 6,584,544 B1 | 6/2003 | Morley et al. | |
| 6,725,392 B1 * | 4/2004 | Frey et al. | 714/6 |
| 6,813,687 B1 | 11/2004 | Hurnlicek | |
| 6,901,479 B2 | 5/2005 | Tomita | |
| 7,032,125 B2 * | 4/2006 | Holt et al. | 714/6 |
| 7,272,613 B2 * | 9/2007 | Sim et al. | 1/1 |
| 7,444,360 B2 * | 10/2008 | Frondozo et al. | 1/1 |
| 2003/0145167 A1 | 7/2003 | Tomita | |

OTHER PUBLICATIONS

U.S. Notice of Allowance / Allowability dated Dec. 10, 2009 in U.S. Appl. No. 11/450,652.

* cited by examiner

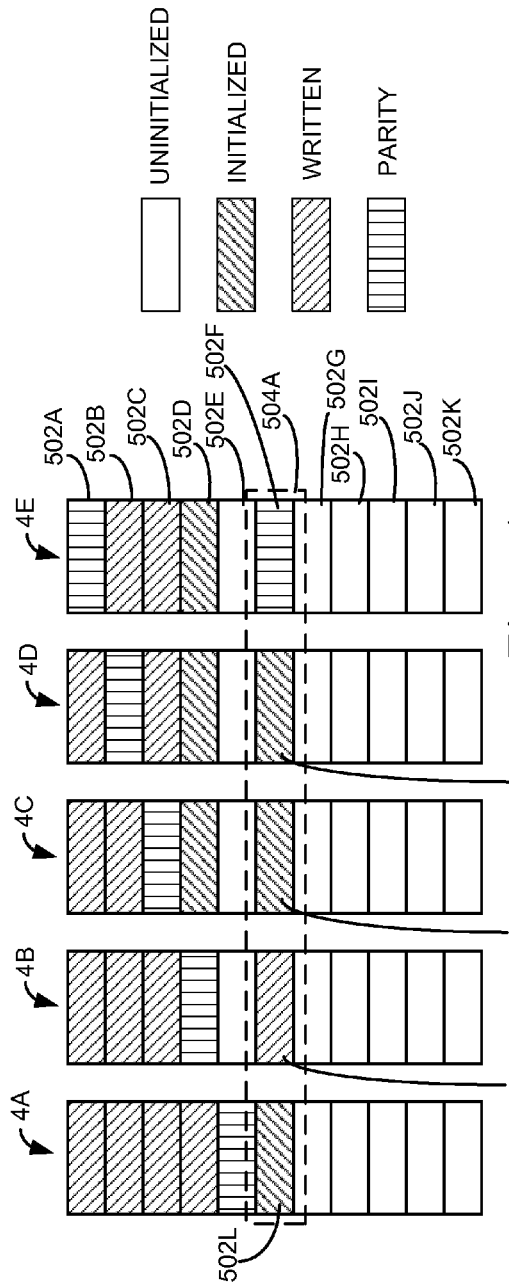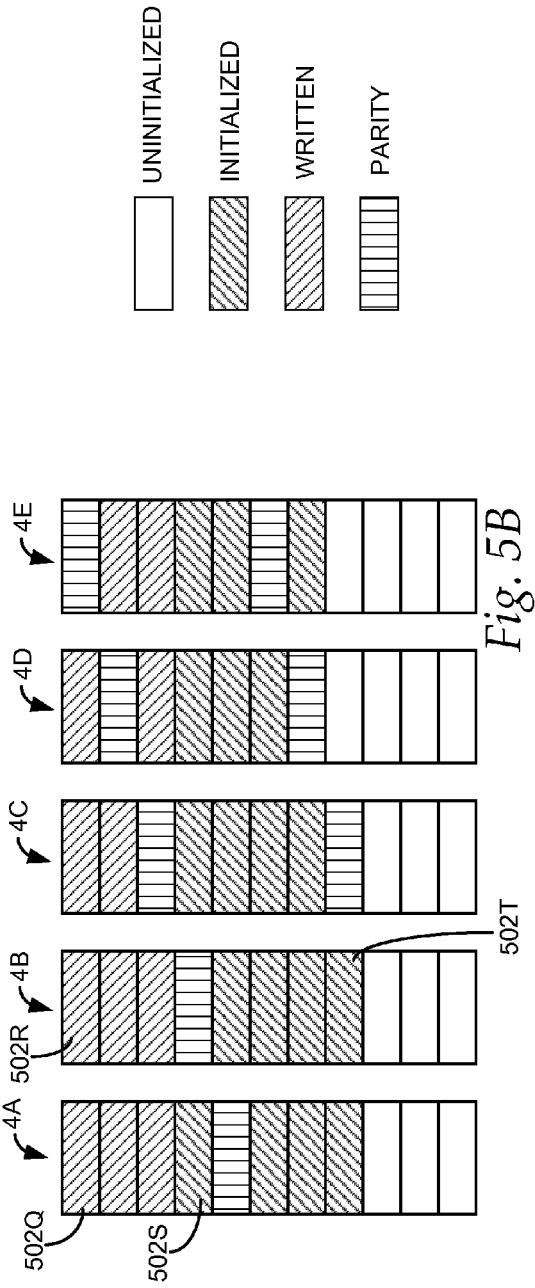

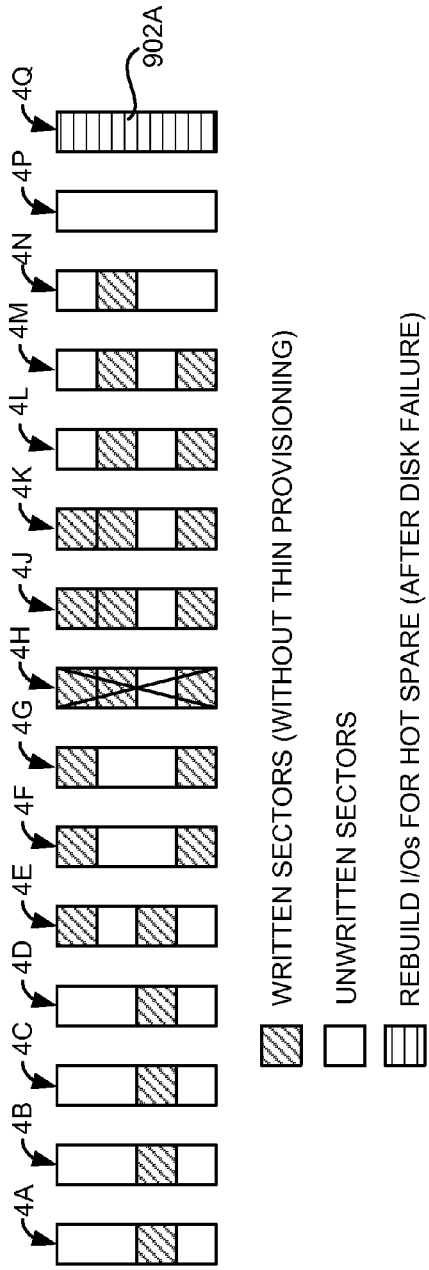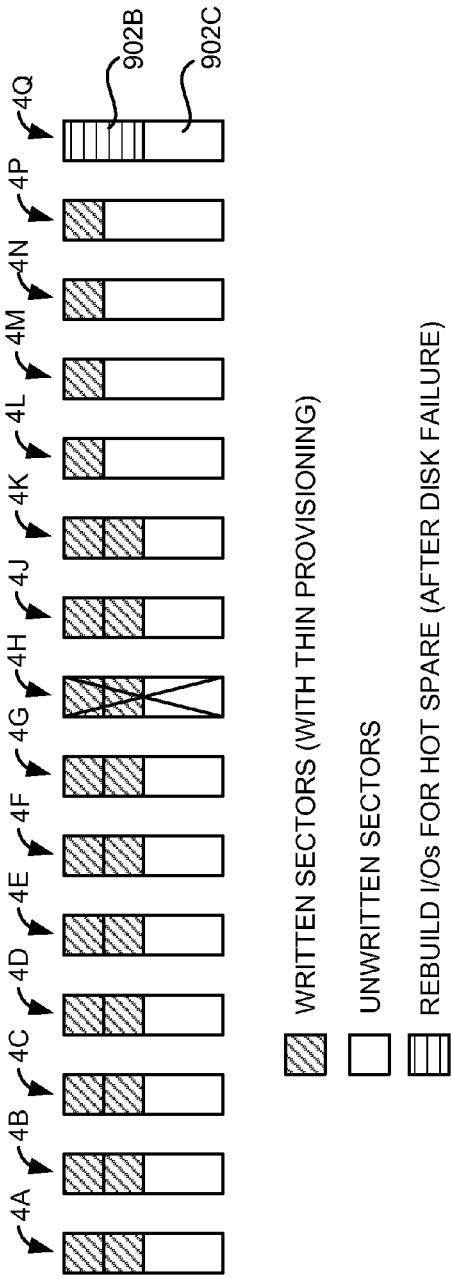
Fig. 9A
Fig. 9B

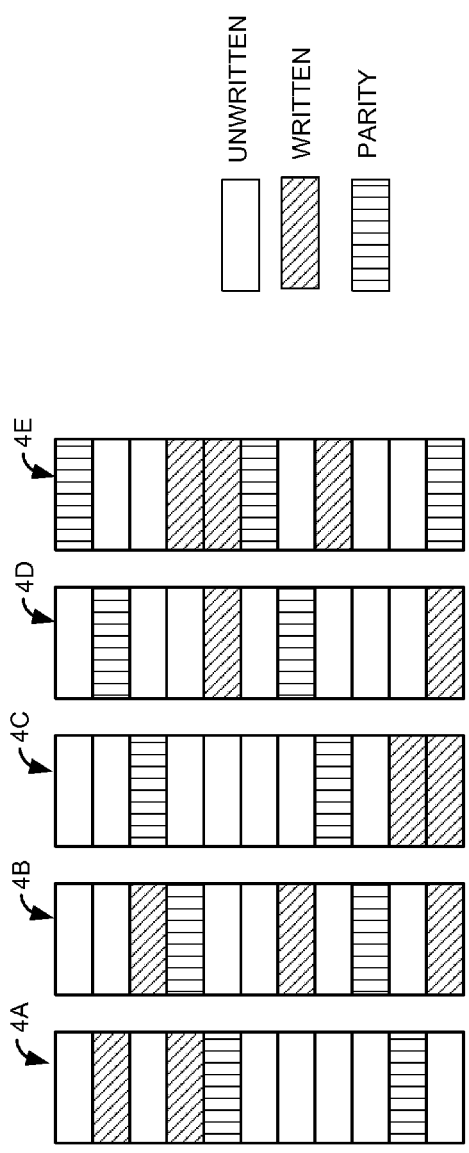
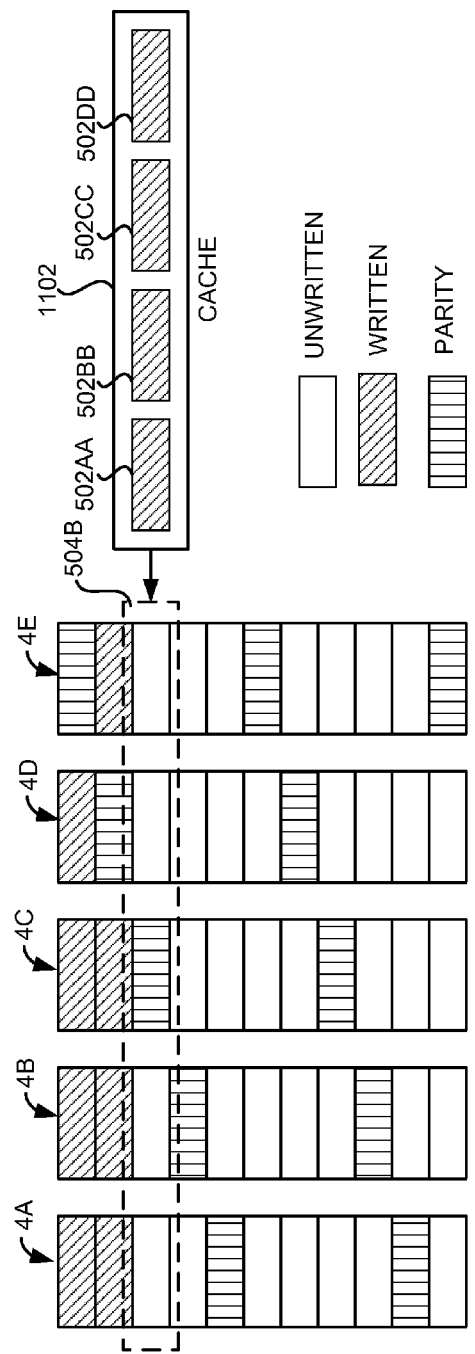
Fig. 11A
Fig. 11B

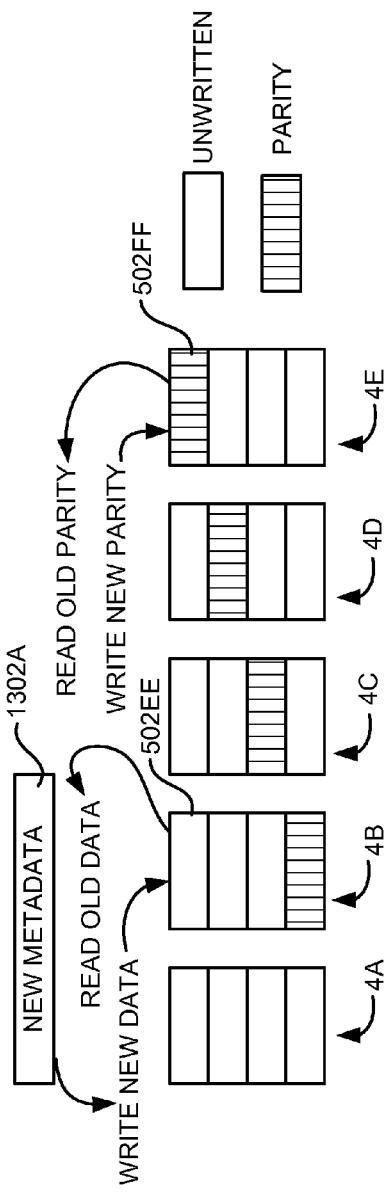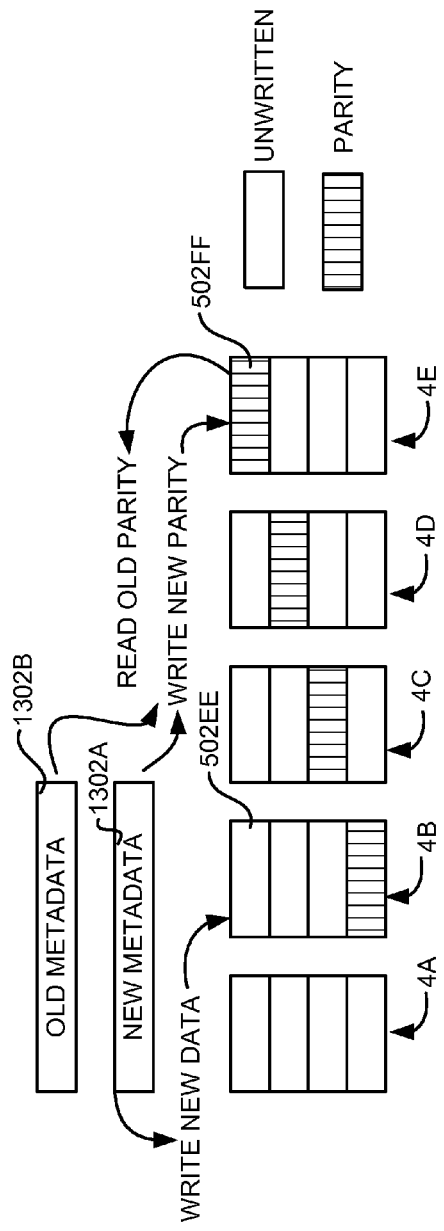

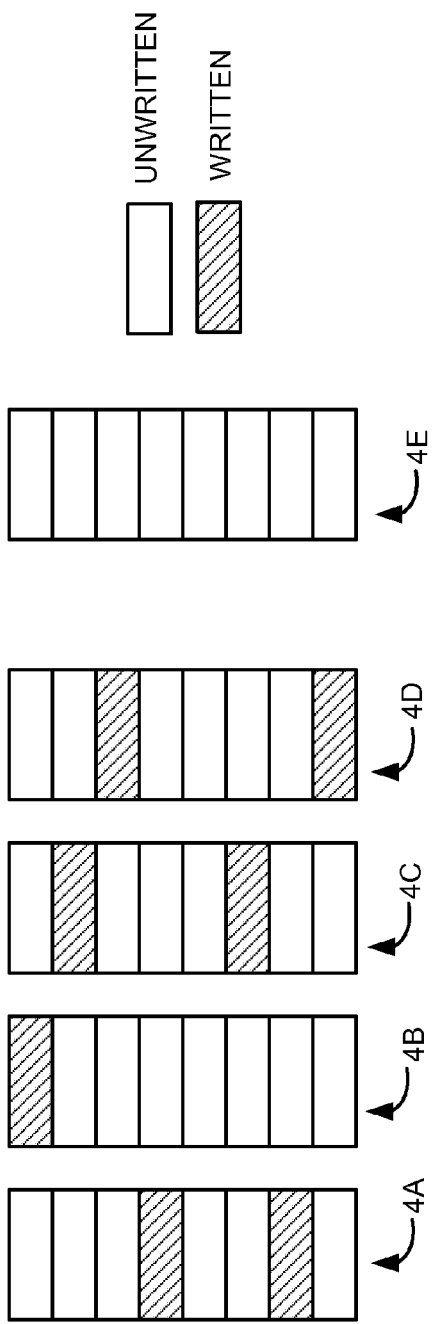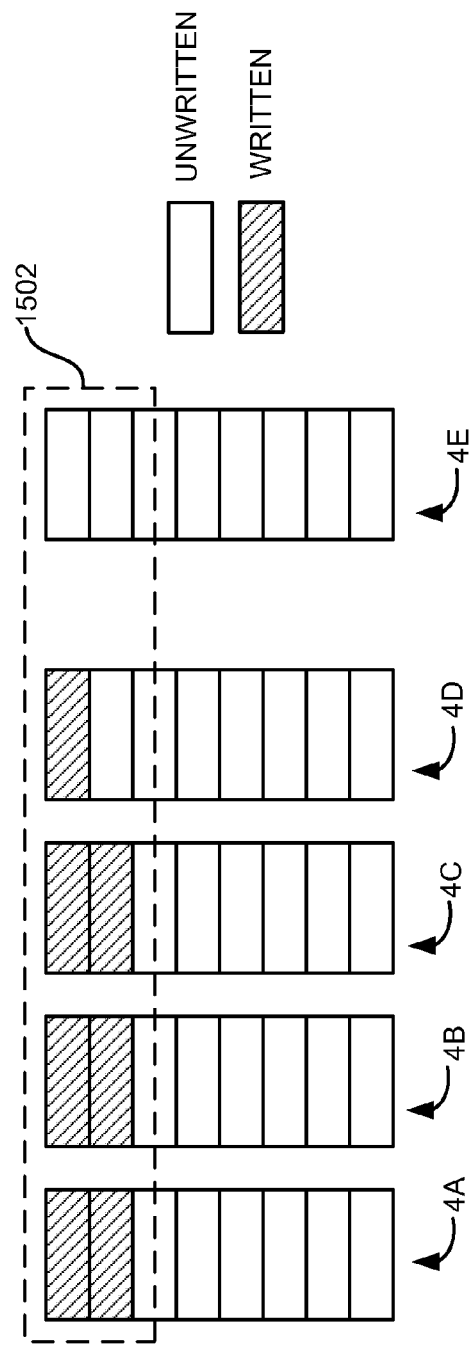

US 7,802,063 B1

METHOD, SYSTEM, APPARATUS, AND COMPUTER-READABLE MEDIUM FOR IMPROVING DISK ARRAY PERFORMANCE

CROSS-REFERENCE TO RELATED APPLICATIONS

This application is a division of U.S. patent application Ser. No. 11/450,652, filed Jun. 9, 2006, now U.S. Pat. No. 7,711,897, issued May 4, 2010, and entitled "Method, System, Apparatus, and Computer-Readable Medium for Improving Disk Array Performance," which claims the benefit of U.S. provisional patent application No. 60/689,481, filed on Jun. 10, 2005 and entitled "A Novel Method of Implementing RAID", both of which are expressly incorporated herein by reference in their entirety.

TECHNICAL FIELD

The present invention is related to the field of computer data storage systems. More particularly, the present invention is related to the field of improving the performance of data storage disk arrays.

BACKGROUND OF THE INVENTION

Redundant Array of Inexpensive Disk ("RAID") arrays are extensively used in the storage industry to improve the performance and reliability of mass storage installations. Commonly used RAID configurations, such as RAID 1, RAID 5, and RAID 6 achieve greater reliability by providing redundancy. This redundancy makes the disk array tolerant to failures of individual disks and speeds up data reads through the simultaneous use of multiple drives. However, these RAID configurations achieve such results at the expense of reduced write performance, since additional writes must be performed on multiple disks, either as data writes or as parity writes.

RAID arrays must also support operations such as rebuilding a degraded array on a hot-spare or replacement disk, capacity expansion by the addition of extra disks to an array, and other similar maintenance operations. These operations are typically costly on a RAID array in terms of the time it takes for completion and the performance penalty incurred while the operation is taking place. For instance, some operations, such as rebuilding a degraded array, may take hours or even days to complete. While the operation is being performed, the array in many cases is operating in a degraded mode that severely reduces performance. Because the benefit of the operation is not realized until it has fully completed, this long period of reduced performance can be frustrating for a system administrator and for users of the disk array.

RAID arrays with redundancy may also incur penalties during the start-up, or initialization, of the array. Because these arrays achieve redundancy by maintaining a particular data configuration (data is typically mirrored or protected by a parity bit), it is necessary for the array to be consistent within itself. This consistency is achieved by a long and arduous initialization phase that is performed when an array is initially brought up. During this time, there is a significant drain on the input/output ("I/O") performance of the array as a result of the additional I/O operations needed for initialization. These additional I/O operations may also cause disk thrashing. The significant time needed for initialization and the performance penalty incurred during the initialization of a RAID array can also be frustrating for a system administrator and the users of the disk array.

It is with respect to these considerations and others that the present invention has been made.

SUMMARY OF THE INVENTION

A method, system, apparatus, and computer-readable medium for improving the performance of a mass storage device array, such as a disk array, are provided. Through the embodiments of the invention, improved performance is provided in mass storage arrays during initialization, writing, rebuilding, metadata writes, capacity expansion. These benefits are realized through the utilization of thin provisioning with a redundant mass storage array.

Thin provisioning refers to a process of allocating physical capacity to logical volumes on an as-needed basis. Moreover, data structures containing a mapping between the logical location of stored data and its actual location on a physical device are maintained. Through the use of this mechanism, physical storage space can be allocated sequentially, regardless of the order of logical writes. In this manner, the data stored on the array grows in a linear manner. Moreover, the data structures maintained by the thin provisioning mechanism can be used to identify the portions of a device or an array that have been previously written. This information allows redundant arrays, such as RAID arrays, to perform initialization, rebuild, and data migration operations only on portions that been written, and not on areas that have not been utilized by a higher layer. This information also allows the array to be initialized in the background utilizing efficient techniques that have previously only been available for use with foreground processes.

According to one aspect of the invention, a method for initializing a mass storage array made up of two or more mass storage devices is provided. According to the method, the array is subdivided into stripes having a block stored on each of the devices. One or more data structures are maintained that contain data identifying the blocks of the array that have been written to. In order to initialize the array, or an individual device within the array, the blocks that have been previous written to are identified from the data structures. Only the blocks that have not been written to are initialized. The initialization process may be performed by writing all zeroes to the blocks that have not been previously written to, using, for instance, the SCSI WRITE-SAME command to decrease memory and I/O bus utilization.

According to other aspects, a request to write data in a specified block may be received during initialization. In response to such a request, a determination is made using the data structures as to whether the stripe containing the specified block has been previously written to. If the stripe has not been written to, the data is written to the block, zeroes are written to other blocks in the stripe, and the data is written to the parity block for the stripe. If the stripe has been written to, the data is written to the specified block and the parity block is updated using the newly written data. A request may also be received to read data from a block. In response to the read request, the data structures are used to determine if data has been previously written to the block from which the read is to be made. If no data has been written to the block, zeroes are returned in response to the read request without reading from the device.

According to another aspect of the invention, a method is provided for rebuilding a mass storage array, such as a disk array, following the failure of one of the devices of the array. Data structures are maintained that contain data identifying the portions of each mass storage device in the array that have been written to. When a device fails the portions of the array that were previously written are identified using the data structures. Using this information, only the written portions of the failed device can then be rebuilt onto a spare mass storage device. In particular, only the portions of the spare device are rebuilt that correspond to portions of the array that had been previously written to. The remaining portions of the spare device are initialized. The unwritten portion of the array can be made available immediately as non-degraded but uninitialized storage space.

According to another aspect, a method is provided for caching data written to a mass storage array divided into stripes and rows. According to the method, space is allocated on the array for new writes in a sequential fashion using a thin provisioning mechanism. A cache memory is also provided that is no larger in size than a single stripe of the array. When new writes are received directed to blocks on the array, the writes are placed in the cache. When an entire stripe of data writes are accumulated, the entire stripe is written to the underlying mass storage device. In this manner, even random writes can be effectively cached.

According to another aspect, write performance for writing storage system metadata is improved. According to this aspect, metadata relating to a mass storage array is maintained in a computer memory. For instance, the metadata may comprise the data structures utilized by a thin provisioning system. When the metadata changes, such as in response to the modification of the underlying data, changed metadata is created in the memory. A parity block is then read from the row of the array where the changed metadata is to be stored. A new parity is calculated for the row using only the old metadata, the changed metadata, and the parity read from the stripe. The old metadata need not be read from disk expressly, as is usually done. Instead, the value that is present in memory before the metadata change is utilized directly to calculate the new parity. The changed metadata and the new parity are then written to the array.

According to another aspect, a method for expanding the capacity of a mass storage array is provided. According to the method, one or more data structures are maintained that contain data identifying the stripes of the array that have been written to. When the addition of a new device to the array is detected, the written and unwritten portions of the array are identified using the data structures. Only the portions of the array that have been written to are rebuilt onto the newly added device. The portion of the new mass storage device that correspond to the unwritten portion of the array are initialized, using, for instance, the SCSI WRITE-SAME command to decrease CPU and IO bus utilization.

The above-described aspects of the invention may also be implemented as a computer-controlled apparatus, a computer process, a computing system, an apparatus, or as an article of manufacture such as a computer program product or computer-readable medium. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features as well as advantages, which characterize the present invention, will be apparent from a reading of the following detailed description and a review of the associated drawings.

BRIEF DESCRIPTION OF THE DRAWINGS

FIGS. 5A-5B are block diagrams showing the arrangement of data stored on a mass storage array in various embodiments of the invention;

FIGS. 9A-9B are block diagrams showing the arrangement of data stored on a mass storage array in various embodiments of the invention;

FIGS. 11A-11B are block diagrams showing the arrangement of data stored on a mass storage array in various embodiments of the invention;

FIGS. 13A-13B are block diagrams showing the arrangement of data stored on a mass storage array in various embodiments of the invention;

FIGS. 15A-15B are block diagrams showing the arrangement of data stored on a mass storage array in various embodiments of the invention.

DETAILED DESCRIPTION OF THE INVENTION

Figure 1:
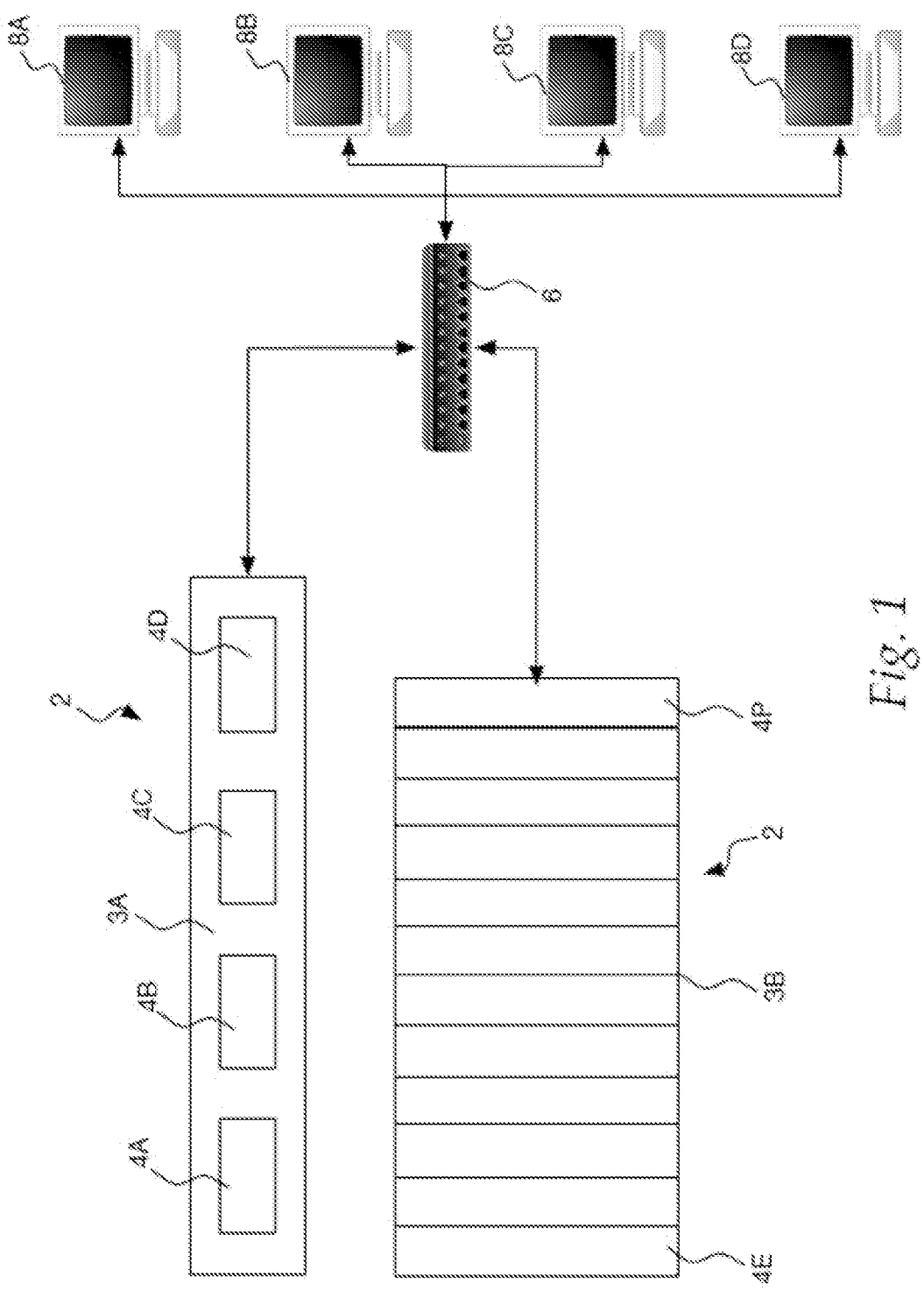
FIG. 1 is a computer architecture diagram showing aspects of a computer network utilized as an illustrative operating environment for the various embodiments of the invention.

Embodiments of the present invention provide a method, system, apparatus, and computer-readable medium for improving the performance of a disk array. Through the embodiments of the invention, the performance of a disk array in performing common functions such as initialization, metadata writes, caching, rebuilding, and capacity expansion is improved. In the following detailed description, references are made to the accompanying drawings that form a part hereof, and in which are shown by way of illustration specific embodiments or examples. Referring now to the drawings, in which like numerals represent like elements through the several figures, aspects of the present invention and the exemplary operating environment will be described.

Figure 2:
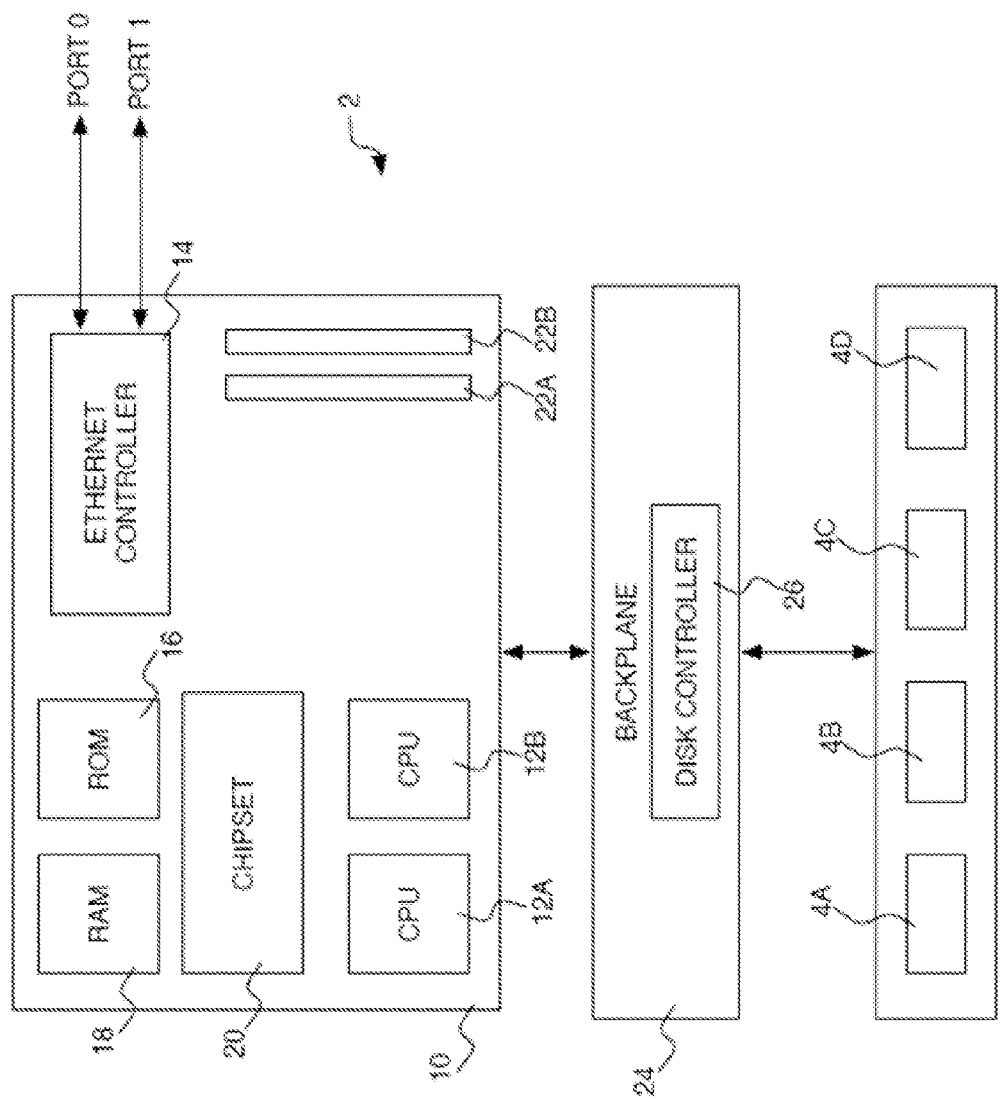
FIG. 2 is a computer architecture and network diagram illustrating aspects of a storage server computer provided by the various embodiments of the invention.
Figure 3:
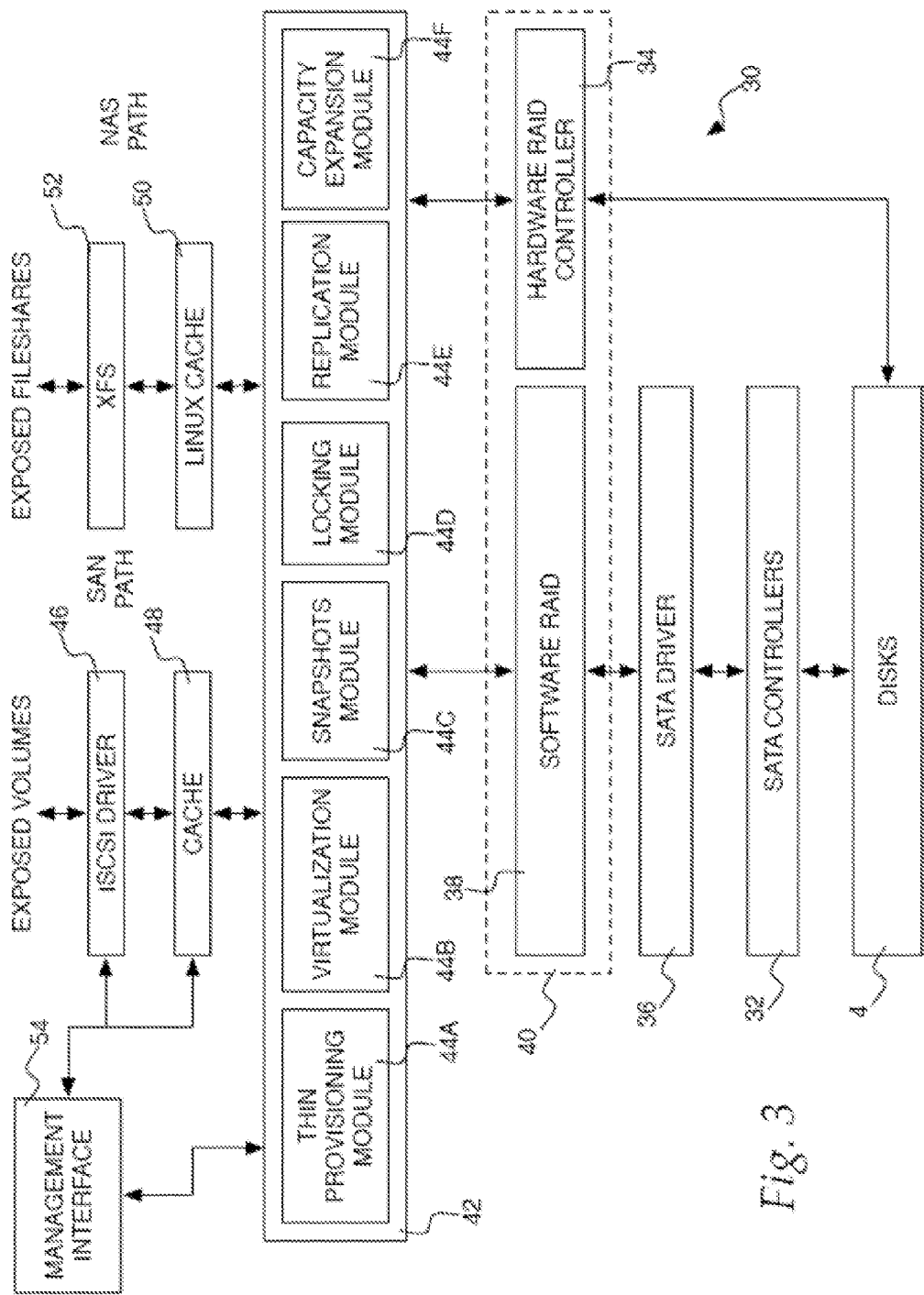
FIG. 3 is a software architecture diagram illustrating various aspects of a storage stack utilized by a storage server provided in embodiments of the invention.

FIGS. 1-3 and the following discussion are intended to provide a brief, general description of a suitable computing environment in which the invention may be implemented.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices. While the invention will be described in the general context of program modules that execute in conjunction with an operating system on a computer system, those skilled in the art will recognize that the invention may also be implemented in combination with other program modules. Moreover, although the invention will be described in the context of an array of hard disk drives, it should be appreciated that the invention may be utilized with any type of mass storage device. Moreover, it should be appreciated that the various aspects of the invention may also be utilized in many cases with a single mass storage device.

Referring now to FIG. 1, an illustrative operating environment for the various embodiments of the present invention will be described. As shown in FIG. 1, the embodiments of the invention described herein may be implemented in a storage server computer 2 that is operative to receive and respond to requests to read and write data to a mass storage array, such as an array of hard disk drives. According to embodiments of the invention, the storage server computer 2 may be housed in a one rack space unit 3A storing up to four hard disk drives 4A-4D. Alternatively, the storage server computer may be housed in a three rack space unit 3B storing up to fifteen hard disk drives 4E-4P. Other types of enclosures may also be utilized that store fewer or more hard disk drives. In this regard, it should be appreciated that the type of storage enclosure and number of hard disk drives utilized is not generally significant to the implementation of the embodiments of the invention. Any type of storage enclosure and virtually any number of hard disk devices or other types of mass storage devices may be utilized without departing from the spirit and scope of the invention.

According to embodiments, the storage server computer 2 includes one or more network ports operatively connected to a network switch 6 using appropriate network cabling. It should be appreciated that, according to embodiments of the invention, Ethernet or Gigabit Ethernet may be utilized. However, it should also be appreciated that other types of suitable physical connections may be utilized to form a network of which the storage server computer 2 is a part.

The network switch 6 is connected to one or more client computers 8A-8D (also referred to herein as "initiators"). It should be appreciated that other types of networking topologies may be utilized to interconnect the clients and the storage server. It should also be appreciated that the initiators 8A-8D may be connected to the same local area network ("LAN") as the storage server computer 2 or may be connected to the storage server computer 2 via a distributed wide area network, such as the Internet. An appropriate protocol, such as the Internet Small Computer Systems Interface ("iSCSI") protocol or the Serial Attached SCSI ("SAS") protocol may be utilized to enable the initiators 8A-8D to communicate with and utilize the various functions of the storage server computer 2 over a wide area network such as the Internet.

According to the various aspects of the invention, the storage server computer 2 is operative to receive and respond to requests from the initiators 8A-8D to read or write data on the hard disk drives 4A-4P. As described in greater detail herein, the storage server computer 2 is operative to provide advanced features for data storage and retrieval to the clients. In particular, the storage server computer may provide redundant array of inexpensive disks ("RAID") functionality for the hard disk drives 4A-4P. The storage server computer 2 may also allow the hard disk drives 4A-4P to be partitioned into logical volumes for access by the initiators 8A-8D. Additional advanced features described herein may also be provided by the storage server computer 2.

Turning now to FIG. 2, an illustrative computer hardware architecture for practicing the various embodiments of the invention will now be described. In particular, FIG. 2 shows an illustrative computer architecture and implementation for the storage server computer 2. In particular, the storage server computer 2 includes a baseboard 10, or "motherboard", which is a printed circuit board to which a multitude of components or devices may be connected by way of a system bus or other electrical communication path. In one illustrative embodiment, these components include, without limitation, one or more central processing units ("CPU") 12A-12B, a network adapter, such as the Ethernet controller 14, a system memory, including a Read Only Memory 16 ("ROM") and a Random Access Memory 18 ("RAM"), and other hardware for performing input and output, such as a video display adapter or a universal serial bus port ("USB"), not all of which are illustrated in FIG. 2.

The motherboard 10 may also utilize a system board chipset 20 implementing one or more of the devices described herein. One or more hardware slots 22A-22B may also be provided for expandability, including the addition of a hardware RAID controller to the storage server computer 2. It should also be appreciate that, although not illustrated in FIG. 2, a RAID controller may also be embedded on the motherboard 10 or implemented in software by the storage server computer 2. A SAS controller may also be embedded in the motherboard 10. It is also contemplated that the storage server computer 2 may include other components that are not explicitly shown in FIG. 2 or may include fewer components than illustrated in FIG. 2.

As described briefly above, the motherboard 2 utilizes a system bus to interconnect the various hardware components. The system bus utilized by the storage server computer 2 provides a two-way communication path for all components connected to it. As discussed briefly above, the system memory in the storage server computer 2 may include a RAM 18 and a ROM 16. The ROM 16 may store a basic input/output system or Extensible Firmware Interface ("EFI") compatible firmware that includes program code containing the basic routines that help to transfer information between elements within the storage server computer 2. As also described briefly above, the Ethernet controller 14 may be capable of connecting the local storage server computer 2 to the initiators 8A-8D via a network. Connections which may be made by the network adapter may include local area network LAN or WAN connections. LAN and WAN networking environments are commonplace in offices, enterprise-wide computer networks, intranets, and the Internet. The CPUs 12A-12B utilized by the storage server computer 2 are standard central processing units that perform the arithmetic and logical operations necessary for the operation of the storage server computer 2. CPUs are well-known in the art, and therefore not described in further detail herein. A graphics adapter may or may not be utilized within the storage server computer 2 that enables the display of video data (i.e., text and/or graphics) on a display unit.

As shown in FIG. 2, the motherboard 10 is connected via a backplane 24 and disk controller 26 to one or more mass storage devices. The mass storage devices may comprise hard disk drives 4A-4D or other types of mass storage devices. The mass storage devices may store an operating system suitable for controlling the operation of the storage server computer 2, such as the LINUX operating system. The hard disk drives may also store application programs and virtually any other type of data. It should be appreciated that the operating system comprises a set of programs that control operations of the storage server computer 2 and allocation of resources. The set of programs, inclusive of certain utility programs, may also provide a graphical user interface to a user. An application program is software that runs on top of the operating system software and uses computer resources made available through the operating system to perform application specific tasks desired by the user.

The mass storage devices and their associated computer-readable media, provide non-volatile storage for the storage server computer 2. Although the description of computer-readable media contained herein refers to a mass storage device, such as a hard disk or CD-ROM drive, it should be appreciated by those skilled in the art that computer-readable media can be any available media that can be accessed by the local storage server. By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

Turning now to FIG. 3, an illustrative computer software architecture for practicing the various embodiments of the invention will now be described. In particular, FIG. 3 illustrates a storage stack 30 utilized in the embodiments of the invention. At the top of the storage stack 30, storage volumes or fileshares are exposed to the initiators 8A-8D. At the bottom of the storage stack 30 are the actual mass storage devices, such as the disks 4, that are utilized to store the data. The mass storage devices are, in turn, connected to a disk controller, such as a Serial ATA ("SATA") controller 32 or a hardware RAID controller 34. In the case of a SATA controller, a SATA driver 36 may be utilized to access the hardware device. Additionally, a software RAID module 38 may also be utilized to provide RAID services in the absence of a hardware RAID controller 34. A unified RAID management layer 40 may be utilized to simplify the utilization of RAID with either software or hardware implementations.

The RAID management layer 40 is operative to create a RAID array from the disks 4. As known to those skilled in the art, RAID is a system of using multiple mass storage devices for sharing or replicating data among the devices. Depending upon the version of RAID chosen, the benefits of RAID can include increased data integrity, fault-tolerance, and throughput. A number of different RAID levels are available for use, such as RAID 0 where data is striped across multiple devices, RAID 1 where data is mirrored between devices, RAID 0+1 where data is striped and mirrored, and RAID 5 where data is striped across devices and where parity data for each stripe is distributed across all of the devices.

In RAID 5, every time a block is written to a disk, a parity block is generated within the same stripe. A block is often composed of many consecutive sectors on a disk. A series of blocks (a block from each of the disks in an array) is collectively called a stripe. If another block, or some portion of a block, is written on that same stripe, the parity block is recalculated and rewritten. The disk used for the parity block is staggered from one stripe to the next. It should be appreciated that while the embodiments of the invention described herein are described in the context of a mass storage array striped utilizing RAID 5, other RAID levels may be utilized. Additionally, other methods of creating an array from two or more mass storage devices may also be utilized.

Above the unified RAID management layer 40 sits a kernel module 42 that implements the functions described herein. In particular, the kernel module 42 may provide functionality for implementing thin provisioning, virtualization, snapshots, locking, replication, and capacity expansion. These features are implemented by the modules 44A-44F, respectively. In particular, the thin provisioning module 44A provides the functionality described herein for allocating physical capacity to logical volumes on an as-needed basis. As will be described in greater detail below, the embodiments of the invention utilize various aspects of the thin provisioning module 44A to provide performance enhancements to the software or hardware RAID implementation utilized with the storage server computer 2. Additional details regarding the operation of the thin provisioning module 44A are provided below with respect to FIG. 5.

Above the kernel module 42, a number of software components are utilized depending upon the access mechanism utilized to access the data stored on the hard disk drives 4. In particular, a Storage Area Network ("SAN") path is provided that utilizes a cache 48 and a Internet Small Computer Systems Interface ("iSCSI") driver 46. A Network Attached Storage ("NAS") path is also provided that utilizes a LINUX cache 50 and the XFS high-performance journaling file system 52. Volumes are exposed through the SAN path while fileshares are exposed through the NAS path.

It should be appreciated that the device drive 42 comprises a LINUX-compatible mass storage device driver in embodiments of the invention. However, although the embodiments of the invention are described as being implemented within a LINUX-compatible device driver, the various aspects of the invention may be implemented at different points within the storage stack and in conjunction with other operating systems. For instance, the aspects of the invention may be implemented with the FREEBSD operating system or with the WINDOWS family of operating systems from MICROSOFT CORPORATION of Redmond, Wash. The invention may also be implemented on a multitude of processor families, including the Intel x86 family of processors, the Intel XScale family of processors, or the IBM PowerPC family of processors.

According to embodiments of the invention, a management interface 54 may also be provided for controlling and monitoring the various aspects of the present invention. The management interface communicates with the various layers through software interfaces to retrieve performance data, provide configuration data, and to perform other functions.

Figure 4:
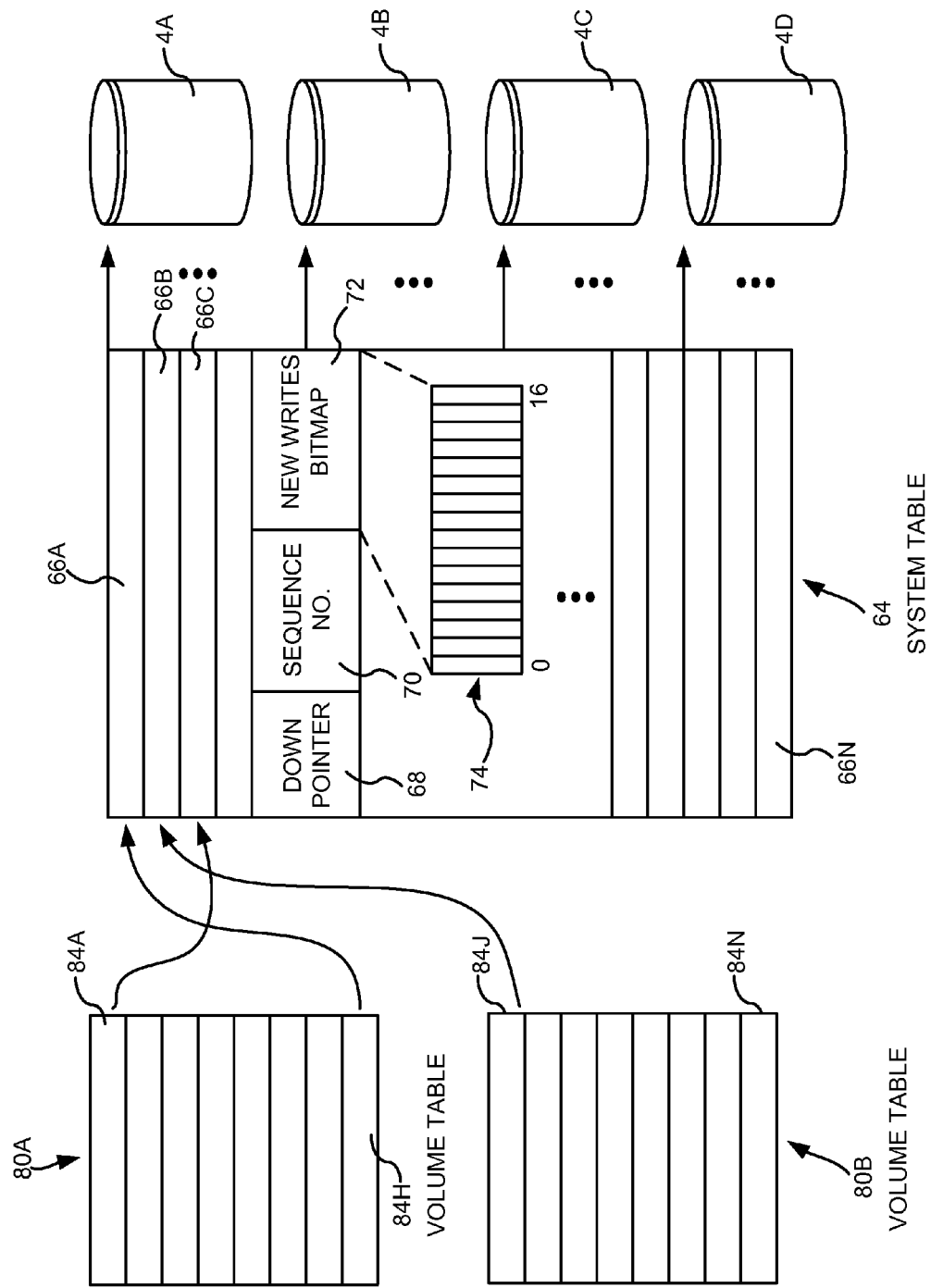
FIG. 4 is a data structure diagram shows aspects of a thin provisioning architecture utilized in the embodiments of the invention.

Referring now to FIG. 4, additional details regarding a mechanism for thin provisioning of the available physical capacity of the computer 2 will be provided. As utilized herein, the term thin provisioning refers to the process of allocating physical capacity on demand. Through the use of the thin provisioning mechanism described herein, it is possible to identify at any time exactly the portions of a mass storage device that have been previously written to and those that have not yet been written. Moreover, the thin provisioning implementation described herein allocates physical storage space sequentially. As will be described in greater detail below, when combined with a RAID implementation these aspects of the thin provisioning mechanism described herein provide great benefits over previous RAID solutions.

As shown in FIG. 4, the available physical capacity of the computer 2 is made up of a number of hard disk drives 4A-4D. The available physical capacity is divided into a number of unique, equally sized areas, called territories. The available physical capacity is further subdivided into units referred to herein as provisions. Provisions comprise unique, equally sized areas of the available physical capacity and are smaller in size than the territories. In particular, according to a preferred embodiment, the provisions are one megabyte ("MB") in size while territories are one gigabyte ("GB") in size. Accordingly, each territory includes one thousand and twenty-four provisions. It should be appreciated that provisions of other sizes may also be utilized, and multiple provision and territory granularities may co-exist in the same server. By subdividing the available physical capacity of the computer 2 into areas of different sizes, the territories and provisions, the physical capacity may be provisioned in units of different sizes when appropriate. Capacity may be provisioned in units of territories in response to new writes being received at a logical volume. Capacity may alternately be allocated in units of provisions when appropriate.

In order to dynamically allocate physical storage space, a system table data structure 64 is utilized. The system table 64 includes a number of entries 66A-66N, each of which is mapped to a unique portion of the available physical storage of the computer 2. If additional physical storage is made available to the computer 2, then additional entries may be added to the system table 64 that correspond to portions of the newly added storage. According to embodiments, each of the entries 66A-66N in the system table 64 corresponds to a provision within the available physical storage space of the computer 2. Each entry 66A-66N in the system table 64 contains a number of data fields that implement a variety of advanced storage features. For example, each entry may include a down pointer field 68, a sequence number field 70, and a new writes bitmap field 72. The sequence number field 70 is utilized to specify the snapshot lifetime that a particular provision is allocated in. The down pointer field 68 is utilized to store a pointer to another entry in the system table 64 that identifies the next physical provision belonging to the same volume and with the same logical provision number. The field 68 is utilized to create a linked list of system table entries from which the data for any provision during any snapshot lifetime can be stored and recreated. The new writes bitmap field 72 is utilized to store a bitmap 74 that indicates whether each chunk of the provision is valid or whether newer data exists for the chunk in another provision. A chunk comprises a $\frac{1}{16}^{th}$ portion of the provision. For a 1 MB provision, therefore, a chunk comprises a 64 kilobyte ("kB") area. It should be appreciated that the provisions may be divided into chunks of different sizes and that more or fewer bits may be utilized in the bitmap 74 to indicate the portions of a provision that contain valid data for a snapshot lifetime. In this manner, the system table 64 provides information regarding each provision in the computer 2.

A volume table 80A-80B is also utilized for each logical storage volume defined in the computer 2. The volume tables 80A-80B include entries 84A-84H and 84J-84N, respectively, for each territory in a logical volume. For instance, the entry 84A corresponds to the first territory in the volume corresponding to the volume table 80A. Other entries in the volume table correspond to other portions of the logical volume.

Each entry in a volume table 80A-80B can be utilized to store a pointer to a territory in the system table 64. The pointer is created when physical space for the logical territory in the volume is allocated. For instance, a first write request may be received that is directed to the territory referenced by the entry 84H of the volume table 80A. In response to the request, physical space is allocated by creating a pointer in the entry 84H to the next available territory, the territory 66A, in the system table 64. If a second write request is received directed to the territory referenced by the entry 84J in the volume table 80B, space is allocated by creating a pointer in the entry 84J to the territory 66B. A third write operation directed to a portion of the volume corresponding to the entry 84A will cause a pointer to be created to the next available territory 66C. In this manner, physical space is allocated for logical territories within volumes on an as needed basis.

When read operations are received, it is necessary to utilize both the volume table for the corresponding logical volume and the system table to perform the read operation. In particular, the appropriate volume table is examined to determine the location within the system table that refers to the territory where the requested data is stored. From the system table, the start of the physical location containing the requested territory can be determined. The offset within the particular territory can then be utilized to locate the actual data.

Based upon the above description of the thin provisioning mechanism provided herein, it should be appreciated that the volume tables and system table together provide a mapping between the logical provisions of a storage volume and the associated physical storage space. It should also be appreciated that through the use of the entries in the system table 64, it is possible to determine at any time exactly the portions of the disks 4A-4D that have been previously written to and those that have not been written to. Moreover, it should be appreciated that through the use of the mapping provided by the volume tables and the system table, space on the disks 4A-4D can be allocated sequentially, even when random writes are received. As will be described in greater detail below, these features of the thin provisioning mechanism provided herein are utilized to great benefit when combined with a RAID subsystem. Additional details regarding the thin provisioning mechanism utilized herein can be found in U.S. Pat. No. 7,536,529 issued on May 19, 2009, entitled "Method, System, Apparatus, and Computer-Readable Medium for Provisioning Space in a Data Storage System," and which is incorporated expressly herein by reference in its entirety.

Referring now to FIGS. 5A-5B, additional details regarding one aspect of the invention for improving the performance of an operation for initializing a mass storage array will be provided. In a typical RAID 5 array, initialization must be performed in one of two ways prior to making the array available for use. This is done to ensure that the parity on the disks is consistent, and thereby ensure data consistency upon the failure of a disk constituting the array. Initialization may be performed in the foreground by writing all zeroes to all disks. This type of operation makes parity consistent, but at the expense of greatly increased start-up time. Alternately, initialization may be performed in the background by reading a full stripe and writing its parity block. This is done at the expense of I/O performance. It is not possible to write zeroes in the background in a traditional RAID implementation because I/O operations may have written meaningful data to various sectors, which will be destroyed by background initialization.

FIGS. 5A-5B illustrate aspects of the invention for initializing a RAID array in the background while fielding write requests in the foreground. In particular, FIGS. 5A-5B show a representation of blocks and stripes in a five disk RAID 5 array. The drives 4A-4E making up the array each have a number of blocks represented by vertical rectangles. For instance, the drive 4E has the blocks 502A-502K. A stripe is represented by a horizontal combination of one block from each drive. For instance, the stripe 504A is made up of the blocks 502L, 502M, 502N, 502P, and 502F. The legend shown in FIGS. 5A-5B indicates which of the blocks are not initialized, initialized, written to, or used to store parity data.

In order to initialize the blocks of the array shown in FIG. 5B, the provision tables described above with respect to FIG. 4 are utilized to identify the areas of the array that have never been written to. The data in these areas can be made consistent by writing zeroes instead of having to read data and write parity. Writing zeroes can be achieved using SCSI commands such as "WRITE-SAME," which have the additional advantage of minimizing bandwidth utilization of the transport and memory buses and decreasing thrashing through the sequentialization of I/O operations.

Likewise, if a write arrives to a location that has not been written, the RAID controller can insert an initialization cycle with the write request. Because the location was never written to previously, an entire row of zeroes and the data can be written instead of just one strip. The RAID controller may also set the parity without having to explicitly calculate it because all of the blocks in the stripe except one are zero, thereby making the parity equal to the newly written data. This has the dual benefit of improving performance by avoiding a parity calculation and performing initialization on the disks at the same time. Additionally, if a read arrives to a location that has not been written, instead of performing a degraded RAID 5 read, the RAID controller detects that the location has not been written and returns zero without performing a read from the array. These processes are described in greater detail below with respect to FIGS. 6-8.

FIG. 5A illustrates how the background initialization process started at the beginning of the array and began writing zeroes to each stripe. FIG. 5A also shows that a new write request was received directed to the block 502M. Because the stripe 502A containing the block 502M has not been initialized, an initialization cycle is inserted to initialize the stripe. In particular, the write is performed on the block 502M, zeroes are written to the blocks 502L, 502N, and 502P. Since all of the blocks in the stripe are zeroes except one, the written data can also be written to the parity block 502F without calculating the parity. Additional details regarding this process are described below with respect to FIGS. 6-8. FIG. 5B illustrates how the sequentialization of new writes and the initialization process described herein reduces disk thrashing.

Figure 6:
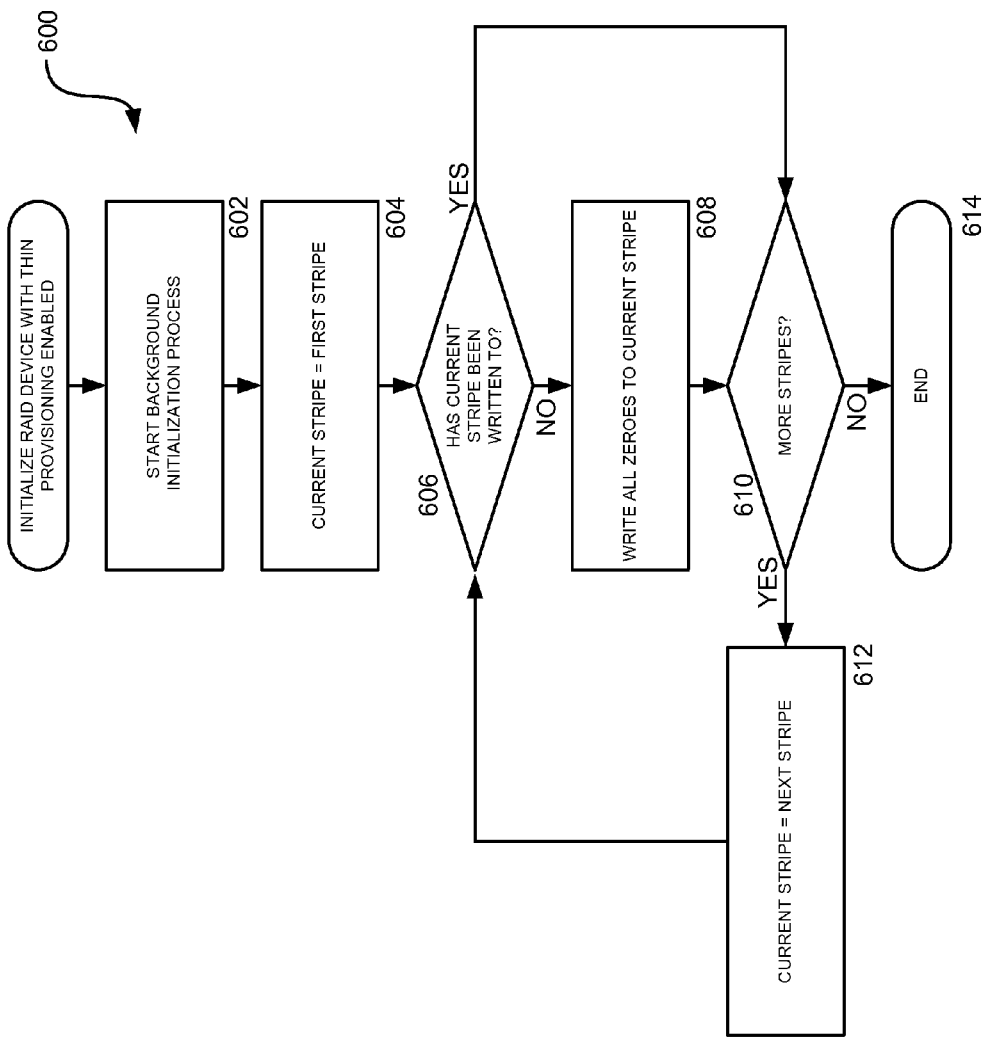
FIGS. 6-8 are flow diagrams illustrating aspects of a process for initializing a mass storage array, fielding write requests during initialization, and reading from a disk array, respectively, according to embodiments of the invention.

Referring now to FIG. 6, additional details regarding the operation of the computer 2 for initializing a device within a mass storage array will be provided. In particular, a routine 600 will be described illustrating initialization operations performed by the computer 2. It should be appreciated that the logical operations of the various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations described herein and making up the embodiments of the present invention are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims attached hereto.

The routine 600 begins at operation 602, where the background process for initializing the disk array is started. It should be appreciated that the process shown in FIG. 6 may be utilized to initialize a single disk in the array or multiple disks concurrently. From operation 602, the routine 600 continues to operation 604, where the first stripe of the array is selected as a current stripe. The routine 600 then continues to operation 606 where a determination is made as to whether the current stripe has been previously written to. This is accomplished through an examination of the provision tables discussed above with respect to FIG. 4. If the current stripe has been previously written to, the routine 600 branches to operation 610, described below. If the current stripe has not been previously written to, the routine 600 continues to operation 608.

At operation 608, zeroes are written to the current stripe. The routine 600 then continues to operation 610, where a determination is made as to whether any additional stripes remain to be initialized. If additional stripes remain to be initialized, the routine 600 branches to operation 612, where the next stripe is set to the current stripe. From operation 612, the routine 600 returns to operation 606, described above. If, at operation 610, it is determined that no additional stripes remain to be initialized, the routine continues to operation 614, where it ends.

Figure 7:
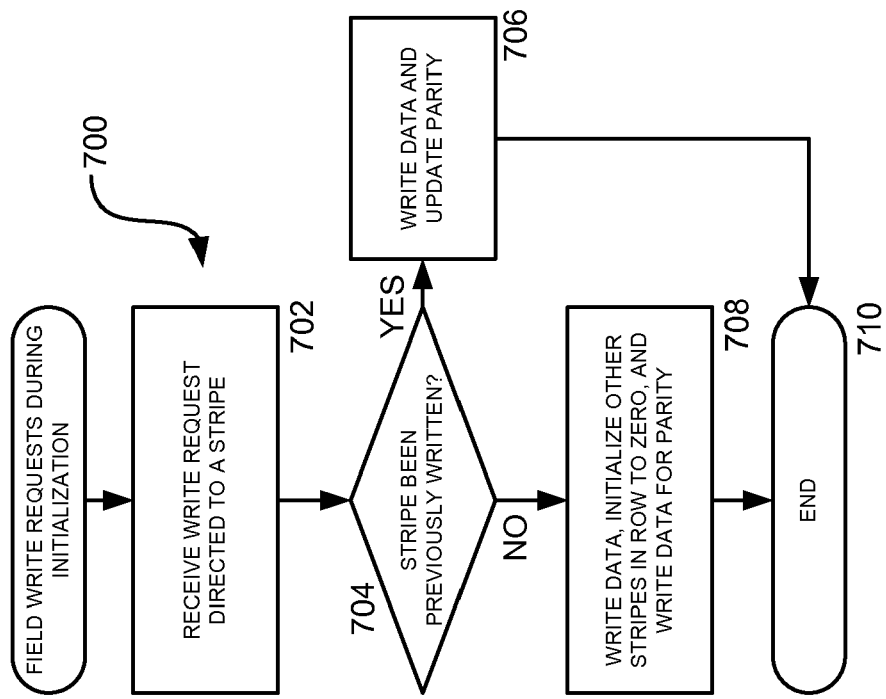

Turning now to FIG. 7, an illustrative routine 700 will be described for fielding write requests received during the initialization process described above with respect to FIG. 6. In particular, the routine 700 begins at operation 702 where a write request is received during the initialization process. The routine then continues to operation 704, where a determination is made as to whether the stripe to which the write request is directed has been previously written to. This determination is made using the provision tables discussed above with respect to FIG. 4. If the stripe has been previously written to, the routine 700 branches from operation 704 to operation 706 where the data is written and the parity is updated in the stripe. From operation 706, the routine 700 continues to operation 710, where it ends.

If, at operation 704, it is determined that the stripe to which the write request is directed has not been written to previously, the routine continues from operation 704 to operation 708. At operation 708, the new data is written to the stripe. The other blocks in the stripe are initialized to zero. Because all of the blocks in the stripe are zero except the newly written data, there is no need to calculate the parity. Accordingly, the new data is also written to the parity block at operation 708. Once these operations have been completed, the routine 700 continues to operation 710, where it ends.

Figure 8:
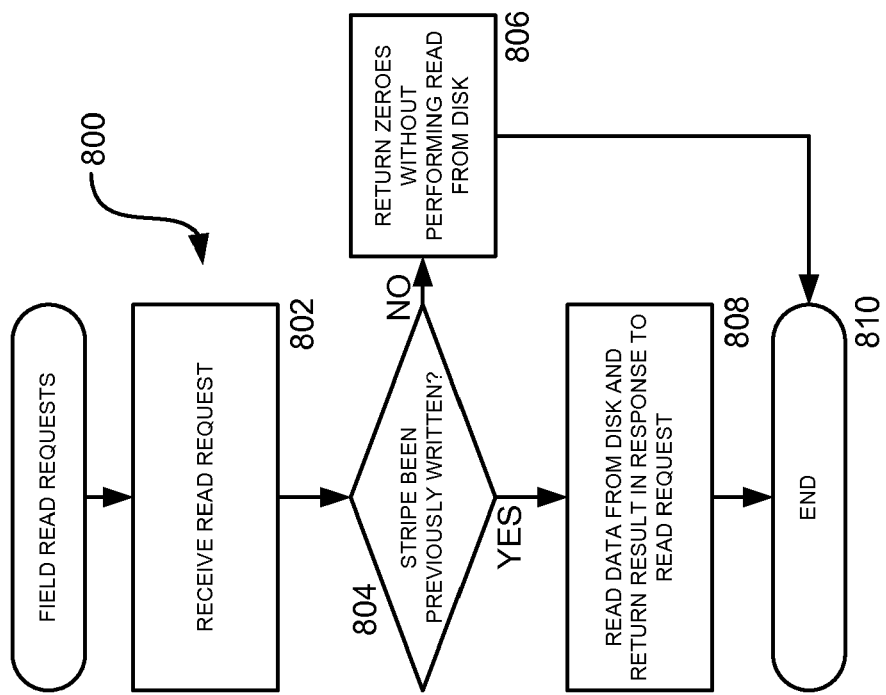

Referring now to FIG. 8, an illustrative routine 800 will be described for reading from a mass storage array that utilizes thin provisioning will be described. The routine 800 begins at operation 802, where a read request is received. In response to the read request, the routine 800 continues to operation 804, where a determination is made as to whether the stripe to which the read request is directed has been previously written to. This determination is made using the provision tables discussed above with respect to FIG. 4. If the stripe has not been previously written, the routine 800 branches to operation 806, where zero is returned in response to the read request without performing a read operation on the array. Because the stripe containing the data to be read has never been written, there is no need to perform an actual read operation.

If, at operation 804, it is determined that the stripe to which the read request is directed has been written, the routine 800 continues to operation 808. At operation 808, an actual read is performed from the array to obtain the requested data. The read data is also returned in response to the request. From operation 808, the routine 800 continues to operation 810, where it ends.

Turning now to FIGS. 9A-9B, additional details regarding a process provided in one embodiment of the invention for rebuilding a RAID array will be provided. FIGS. 9A-9B show aspects of a mass storage array made up of the drives 4A-4P. The drive 4Q is a spare drive that is utilized by the array in the event that one of the drives 4A-4P fails. The drive 4Q may be referred to herein as a "spare" or a "hot-spare," but may be any drive that is utilized to replace a failed or malfunctioning drive. When a drive in an array fails, it is necessary to perform a rebuild operation to rebuild the data that was contained on the failed drive onto the spare drive. In a degraded RAID 5 array with a hot-spare (or in a degraded RAID 5 array in which the faulty drive has just been replaced with a new drive), the traditional method of performing a rebuild is to start the rebuild process independently of I/O operations, retaining the degraded status for the RAID until the rebuild has been completed. When the RAID array is considered degraded, I/O operations are satisfied by reconstructing the lost data using the parity blocks.

FIG. 9A shows a traditional method of rebuilding the array after a drive failure. In the example shown in FIG. 9A, the drive 4H has failed. Accordingly, it is necessary to rebuild the contents of the drive 4H onto the hot-spare drive 4Q. Because traditional RAID arrays do not allocate storage space sequentially, the data on such an array is typically spread randomly throughout the array as shown in FIG. 5A. As such, it is necessary to rebuild the entire portion 902A of the drive 4Q using the data from all of the other drives. This can be an extremely time consuming process.

Because the process for thin provisioning described above results in the sequential allocation of space on a RAID array, if a RAID array has not been fully written, all writes are written starting at the beginning of the disks as shown in FIG. 9B. As a result, the remainder of the disks have not yet been used and will be written to only when write I/O operations arrive to new provisions. In this situation, a rebuild will only need to work on that portion of the array that is used. In other words, only the top portion of the array is considered a degraded RAID 5; the unwritten portion of the array may be considered an uninitialized RAID 5 and writes to this area can treat the entire portion as non-degraded in the manner described above with respect to FIGS. 6-7. This results in only the portion 902B of the drive 4Q having to be rebuild. The portion 902C does not have to be rebuilt and can be initialized by writing zeroes using the SCSI WRITE-SAME command described above. Since it is unlikely that the majority of any RAID array will be written to, this method of performing rebuilds substantially reduces rebuild time. Additional details regarding this process will be provided below with respect to FIG. 10.

Figure 10:
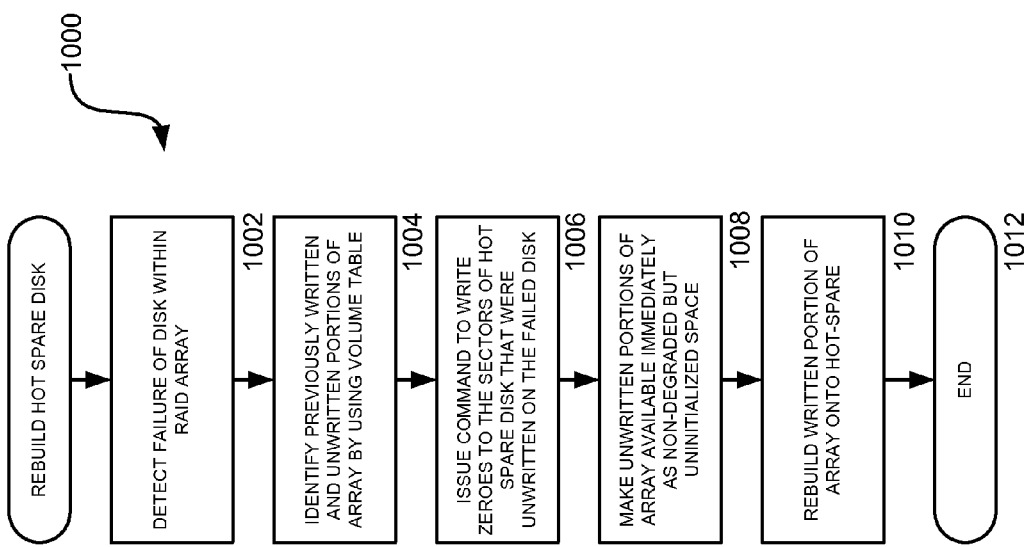
FIG. 10 is a flow diagram showing aspects of a process for rebuilding a spare mass storage device according to one embodiment of the invention.

Turning now to FIG. 10, an illustrative routine 1000 will be described for rebuilding an array following the failure of a disk device in the array. The routine 1000 begins at operation 1002, where the failure of a disk within the array is detected. In response to the detection of the failure, the routine 1000 continues to operation 1004, where the portions of the array that were previously written and unwritten are identified. This is accomplished using the provision tables described above with reference to FIG. 4. Once the written and unwritten portions of the array have been identified, the routine 1000 continues to operation 1006.

At operation 1006, commands are issued to write zeroes to the sectors of a hot-spare disk corresponding to the unwritten portion of the failed device. This process may be performed in the manner described above with respect to FIGS. 6-7. The routine 1000 then continues to operation 1008, where the unwritten portions of the array are made available for I/O operations as non-degraded but uninitialized space. Write operations directed to this area may be processed in the manner described above with respect to FIG. 7. In this manner, the data stored on the hot-spare is made consistent with the other devices at the time a write request is received directed to the unwritten portion of the array. From operation 1008, the routine 1000 continues to operation 1010 where the written portion of the array is rebuilt onto the hot-spare drive. In particular, the data that was stored on the failed drive is reconstructed from the data stored on the surviving drives and the result is stored on the hot-spare. From operation 1010, the routine 1000 continues to operation 1012, where it ends.

Referring now to FIGS. 11A-11B, additional details regarding aspects of the invention for caching write operations directed to a RAID array will be described. In many applications, such as databases and SQL servers, RAID arrays may be considered as storage systems that field a predominately random load. In standard RAID implementations, this randomness precludes any attempt at using a cache to collect I/O operations together in a full-stripe write before dispatching the write to the RAID 5 subsystem. Dispatching full-stripe writes to a RAID-5 subsystem increases the performance greatly, since the parity may be calculated directly from the data that is being written, without having to read the old parity and old data. FIG. 11A illustrates the randomness of typical writes to a RAID array.

In a system that utilizes thin provisioning together with RAID, however, regardless of the randomness in the order in which new write requests are received by the server, the allocation of provisions, and consequently the arrangement of the data on the RAID array, is sequential. Hence, a cache on the physical LBA level is always guaranteed to collect new I/O operations together into sequential stripes, which may be written without incurring a RAID 5 write penalty. This method is particularly effective when redirect-on-write snapshots are active on the volume. FIG. 5B illustrates this process. In particular, data is written sequentially from the beginning of the drives 4A-4E. A small cache memory 1102, typically the size of one or two stripes, may be provided to cache writes. When the blocks 502AA-502DD for an entire stripe 504B has been written to the cache 1102, the cache 1102 is flushed to the disk. Additional details regarding the caching mechanism will be provided below with respect to FIG. 12.

Figure 12:
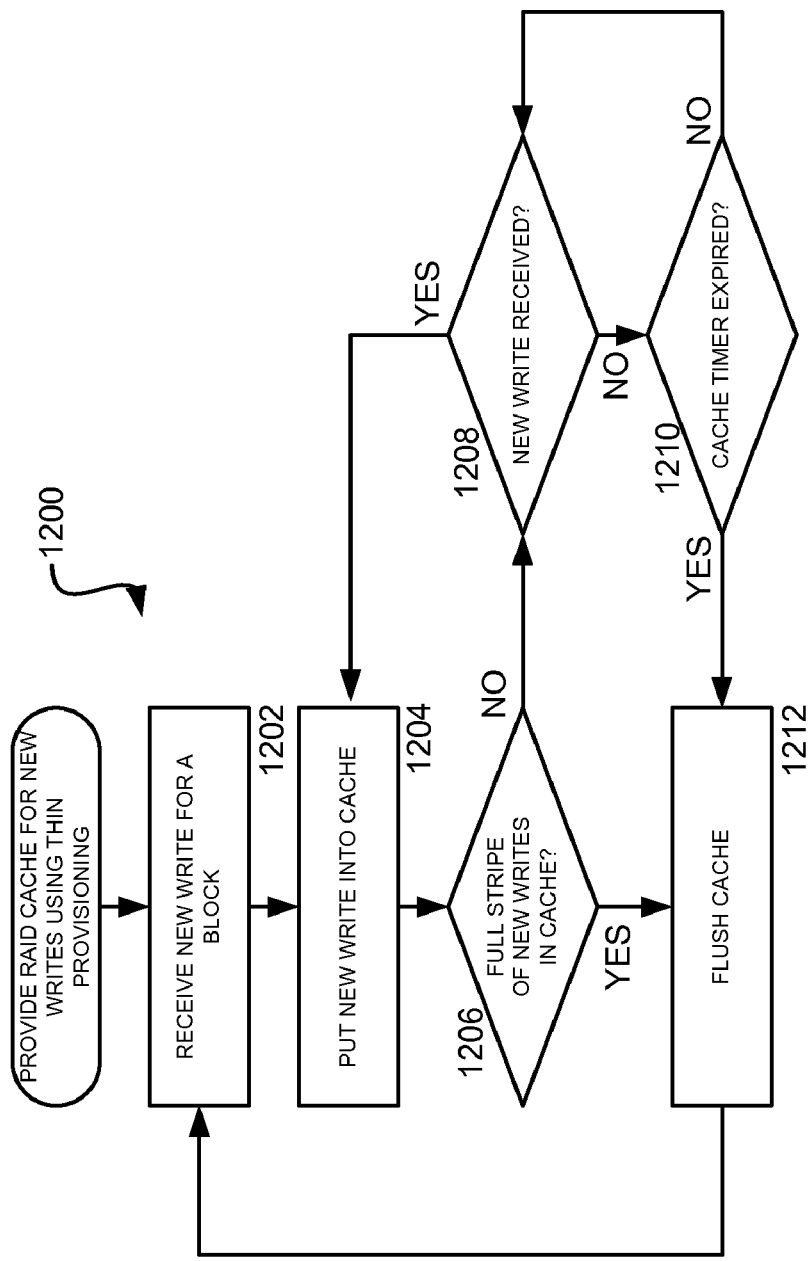
FIG. 12 is a flow diagram illustrating a process for caching new writes directed to a mass storage array in embodiments of the invention.

Turning now to FIG. 12, a routine 1200 will be described for caching write operations in a RAID array with thin provisioning enabled. As discussed above, a small cache memory is provided in the computer 2 for caching writes to the RAID array. The routine 1200 begins at operation 1202, where a new write is received directed to a block on the array. From operation 1202, the routine 1200 continues to operation 1204, where the data for the new write is placed in the cache memory. The routine 1200 then continues to operation 1206, where a determination is made as to whether a full stripe of writes has been placed in the cache. If so, the routine 1200 continues from operation 1206 to operation 1212, where the cache memory is flushed to the disk by writing a full stripe of data all at once. If the cache memory does not contain a full stripe of data, the routine 1200 branches from operation 1206 to operation 1208.

At operation 1208 it is determined if a new write operation has been received. If so, the routine 1200 branches back to operation 1204, described above. If not, the routine 1200 continues from operation 1208 to operation 1210 where a determination is made as to whether a cache time has expired. The cache timer is a time that is set and reset to periodically flush the cache even in the absence of a full cache memory. If the cache timer has not expired, the routine 1200 branches back to operation 1208. If the cache timer has expired, the cache timer is reset and the routine 1200 branches to operation 1212 where the cache memory is flushed.

Referring now to FIGS. 13A-13B, additional details regarding an embodiment of the invention for improving the performance of metadata writes will be described. One common way of maintaining storage system metadata, such as the provision tables discussed above with respect to FIG. 4, on persistent storage is in the form of a structure that represents changes in the portion of the data. Different logical locations of data have different locations for metadata. This metadata must be written every time a mapping changes, and the write penalty this incurs is often prohibitively costly. FIG. 13A shows a typical metadata write where the old metadata is read from block 502EE, the new (or changed) metadata 1302A is generated, the old parity for the stripe containing the metadata is read from block 502FF, the new parity is calculated using the new metadata 1302A, and the new parity and new metadata are written to blocks 502FF and 502EE, respectively.

FIG. 13B illustrates an improved process for performing metadata writes in a RAID array utilizing thin provisioning. Because the storage system in a thin provisioned system has awareness of the underlying RAID array, metadata writes can be performed efficiently. This is because whenever metadata is being committed, the metadata both before and after the change are already known. Knowing the old data and the new data in advance allows the new parity to be calculated without having to perform a read of the old data. This improves performance by eliminating a costly write, which additionally has a tremendous rotational delay associated with it. This is illustrated in FIG. 13B and discussed in greater detail below with respect to FIG. 14.

Figure 14:
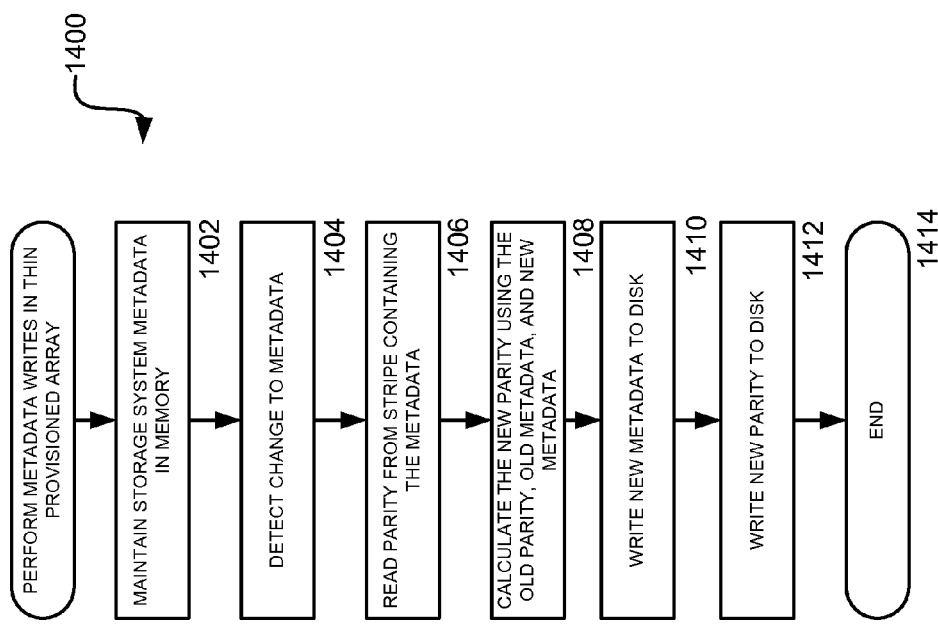
FIG. 14 is a flow diagram showing aspects of a process for performing metadata writes according to one embodiment of the invention.

Turning now to FIG. 14, an illustrative routine 1400 will be described for performing metadata writes in a thin provisioned RAID array. The routine 1400 begins at operation 1402, where the storage system metadata, such as the provision tables described above with respect to FIG. 4, are maintained in system memory. The routine 1400 then continues to operation 1404, where a change is detected to the metadata. As described above, a change to the metadata will occur each time a new write is made to the array. In order to persist the changed metadata, the routine 1400 continues to operation 1406, where the parity block is read from the stripe containing the metadata. The new parity is then calculated at operation 1408 using the old parity, the old metadata, and the new metadata. The routine then continues to operation 1410 where the new metadata is persisted to disk. At operation 1412 the new parity is persisted to disk. The routine 1400 then continues to operation 1414, where it ends.

Referring now to FIGS. 15A-15B, additional details will be provided regarding an embodiment of the invention for improving performance of a RAID array during capacity expansion. When one or more disks are added to a RAID array, the array must be restriped to include the newly added disks. Without a thin provisioned storage stack, the RAID controller has no knowledge of what sectors need to be restriped. Accordingly, traditional RAID implementations must assume that the entire array contains valid data and restripe all sectors in the array. FIG. 15A illustrates an array made up of the drives 4A-4D. Data is distributed randomly across the array. When a new drive 4E is added to the array, the RAID system must assume that the entire array contains valid data and restripe the entire array onto the new drive 4E.

In the embodiments of the invention, however, a RAID array only needs to restripe those sectors that have been written and the parity corresponding to them. This is illustrated in FIG. 15B. In particular, because the RAID system knows exactly which portions of the array have been written to, only the portion 1502 of the array must be restriped onto the newly added drive 4E. Initialization of the non-written portions of the disk may be performed separately, or as described above with respect to FIGS. 6-7. Moreover, the non-written portions can be immediately made available as non-degraded but uninitialized space. Additional details regarding the restriping process are described below with reference to FIG. 16.

Figure 16:
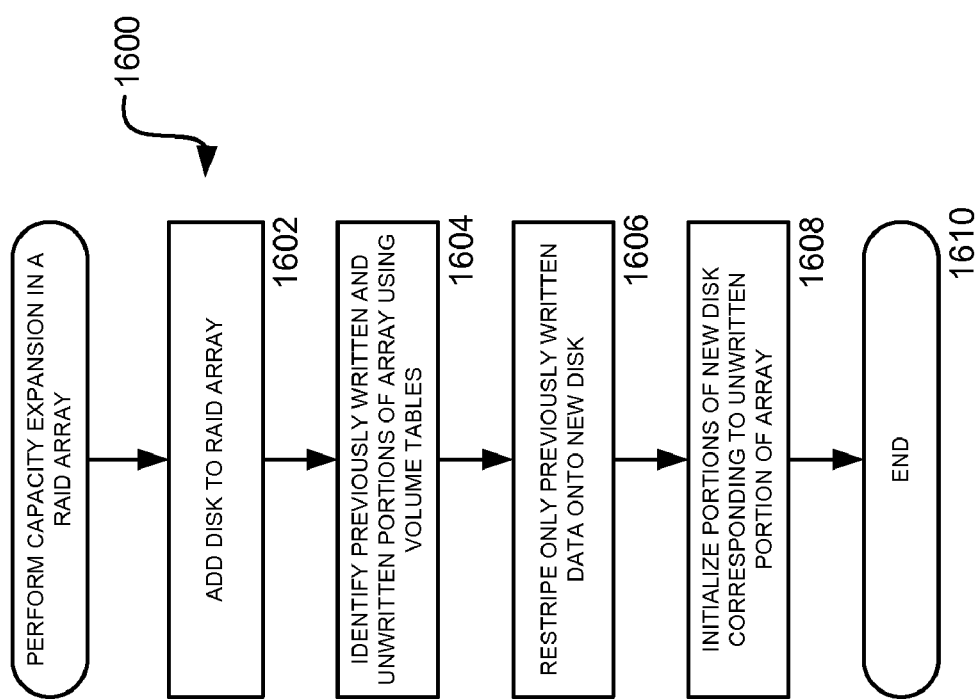
FIG. 16 is a flow diagram showing aspects of an illustrative process for expanding the capacity of a mass storage array according to one embodiment of the invention.

Turning now to FIG. 16, an illustrative routine 1600 will be described for expanding the capacity of a thin provisioned RAID array. The routine 1600 begins at operation 1602 where one or more disks are added to an existing RAID array. The routine 1600 then continues to operation 1604, where the portion of the array that has been previously written is identified. From operation 1606, the routine 1600 continues to operation 1606 where only the previously written portion of the array is restriped onto the new disks. The unwritten portion is initialized in the manner described above with respect to FIGS. 6-7. From operation 1608, the routine 1600 continues to operation 1610, where it ends.

It will be appreciated that embodiments of the present invention provide a method, apparatus, system, and computer-readable medium for improving the performance of disk arrays. It should be appreciated that although the embodiments of the invention described herein have been presented in the context of RAID arrays, the invention may be utilized with other types of disk arrays. The embodiments of the invention may also be utilized directly within a hard disk drive or other type of mass storage device.

Although the invention has been described in language specific to computer structural features, methodological acts, and computer readable media, it is to be understood that the invention defined in the appended claims is not necessarily limited to the specific structures, acts or media described. Therefore, the specific structural features, acts and mediums are disclosed as exemplary embodiments implementing the claimed invention. Moreover, it should be appreciated that, according to the embodiments of the invention, the software described herein has been implemented as a software program executing on a server computer. Alternatively, however, the software operations described herein may be performed by a dedicated hardware circuit, by program code executing on a general-purpose or specific-purpose microprocessor, or through some other combination of hardware and software.

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

What is claimed is:

1. A method for writing metadata to a mass storage array comprising two or more mass storage devices, the array being divided into stripes having two or more blocks, the method comprising:

maintaining metadata relating to the array in a memory;

creating changed metadata from existing metadata stored on the array;

reading a parity block from a stripe of the array where the changed metadata is to be stored;

calculating a new parity for the stripe using only the existing metadata, the changed metadata, and the parity read from the array;

storing the changed metadata on the array; and storing the new parity on the array.

2. A computer-readable medium having computer-readable instructions stored thereon which, when executed, cause a computer to perform the method of claim 1.

3. A computer-controlled apparatus capable of performing the method of claim 1.

* * * * *